(12) United States Patent
Empl

(10) Patent No.: US 10,472,165 B2
(45) Date of Patent: Nov. 12, 2019

(54) PORTION CAPSULE AND METHOD FOR PRODUCING A BEVERAGE BY MEANS OF A PORTION CAPSULE

(71) Applicant: K-FEE SYSTEM GMBH, Bergisch Gladbach (DE)

(72) Inventor: Gunter Empl, Bergisch Gladbach (DE)

(73) Assignee: K-FEE SYSTEM GMBH, Bergisch Gladbach (DE)

( * ) Notice: Subject to any disclaimer, the term of this patent is extended or adjusted under 35 U.S.C. 154(b) by 240 days.

(21) Appl. No.: 14/651,448

(22) PCT Filed: Nov. 26, 2013

(86) PCT No.: PCT/EP2013/074716
§ 371 (c)(1),
(2) Date: Jun. 11, 2015

(87) PCT Pub. No.: WO2014/090567
PCT Pub. Date: Jun. 19, 2014

(65) Prior Publication Data
US 2015/0314954 A1 Nov. 5, 2015

(30) Foreign Application Priority Data

Dec. 14, 2012 (DE) .......................... 10 2012 223 291

(51) Int. Cl.
*B65D 85/804* (2006.01)
*A23F 5/26* (2006.01)
(Continued)

(52) U.S. Cl.
CPC ............ *B65D 85/8043* (2013.01); *A23C 9/00* (2013.01); *A23F 3/18* (2013.01); *A23F 5/262* (2013.01); *A23G 1/56* (2013.01); *B65D 65/466* (2013.01)

(58) Field of Classification Search
None
See application file for complete search history.

(56) References Cited

U.S. PATENT DOCUMENTS

| 923,706 A | 1/1909 | Richey et al. |
| 1,051,426 A | 2/1911 | Matheson |

(Continued)

FOREIGN PATENT DOCUMENTS

| CA | 2436389 A1 | 8/2002 |
| CA | 2327021 C | 1/2005 |

(Continued)

OTHER PUBLICATIONS

English translation of International Preliminary Report on Patentability, dated Jul. 2, 2015, 6 pages.

(Continued)

*Primary Examiner* — Viren A Thakur
*Assistant Examiner* — Thanh H Nguyen
(74) *Attorney, Agent, or Firm* — The Dobrusin Law Firm P.C.

(57) ABSTRACT

The invention relates to a portion capsule for producing a beverage, comprising a capsule body (2), which has a capsule bottom (3) and a filling side (4), wherein a cavity (100) for accommodating a powdery or liquid beverage substrate (101) is formed between the capsule bottom (3) and the filling side (4), wherein a filter element (7) is arranged between the beverage substrate (101) and the capsule bottom (3).

17 Claims, 3 Drawing Sheets

(51) Int. Cl.
   *A23F 3/18*    (2006.01)
   *A23G 1/56*    (2006.01)
   *A23C 9/00*    (2006.01)
   *B65D 65/46*   (2006.01)

(56) References Cited

U.S. PATENT DOCUMENTS

| | | |
|---|---|---|
| 1,036,589 A | 11/1911 | Egleston |
| 1,329,461 A | 2/1920 | Frantz |
| 1,485,200 A | 2/1924 | Roberts et al. |
| 1,689,665 A | 10/1928 | Cramp |
| 2,732,919 A | 1/1956 | Johnson |
| 2,778,739 A | 1/1957 | Rodth |
| 2,847,726 A | 8/1958 | Frick |
| 3,039,153 A | 6/1962 | Dusing |
| 3,183,096 A | 5/1965 | Hiscock |
| 3,261,129 A | 7/1966 | Brydolf et al. |
| 3,327,428 A | 6/1967 | Horton et al. |
| 3,362,588 A | 1/1968 | Harrington et al. |
| 3,416,183 A | 12/1968 | Martin |
| 3,473,266 A | 10/1969 | Miller |
| 3,480,989 A | 12/1969 | Edeus |
| 3,611,637 A | 10/1971 | Saino |
| 3,631,793 A | 1/1972 | Bednartz |
| 3,640,727 A | 2/1972 | Heusinkveld |
| 4,081,880 A | 4/1978 | Edeus |
| 4,325,204 A | 4/1982 | Martine |
| 4,404,770 A | 9/1983 | Markus |
| 4,424,605 A | 1/1984 | Squires et al. |
| 4,452,014 A | 6/1984 | Markus |
| 4,488,387 A | 12/1984 | Foti |
| 4,513,535 A | 4/1985 | Uphoff |
| 4,534,985 A | 8/1985 | Gasau |
| 4,540,595 A | 9/1985 | Acitelli et al. |
| 4,633,614 A | 1/1987 | Van Weelden |
| 4,651,469 A | 3/1987 | Ngian et al. |
| 4,644,151 A | 5/1987 | Piet |
| 4,680,828 A | 7/1987 | Cook et al. |
| 4,676,482 A | 11/1987 | Marvin et al. |
| 4,742,645 A | 5/1988 | Johnston |
| 4,859,337 A | 8/1989 | Woltermann |
| 4,860,645 A | 8/1989 | Van Der Lijn et al. |
| 4,867,993 A | 9/1989 | Nordskog |
| 4,881,346 A | 11/1989 | Block |
| 4,936,049 A | 6/1990 | Hansen |
| 4,976,179 A | 12/1990 | Lacrouts-Cazenave |
| 5,012,629 A | 5/1991 | Rehman et al. |
| 5,028,769 A | 7/1991 | Claypool et al. |
| 5,079,872 A | 1/1992 | Short |
| 5,108,768 A | 4/1992 | So |
| 5,242,702 A | 9/1993 | Fond |
| 5,243,164 A | 9/1993 | Erickson et al. |
| 5,251,758 A | 10/1993 | Kolacek |
| 5,301,468 A | 4/1994 | Kameaki |
| 5,325,765 A | 7/1994 | Sylvan et al. |
| 5,351,442 A | 10/1994 | Gingras |
| 5,450,693 A | 9/1995 | Tarrega |
| 5,461,829 A | 10/1995 | Lehto et al. |
| 5,496,573 A | 3/1996 | Tsuji et al. |
| 5,535,765 A | 7/1996 | Takashima |
| 5,566,505 A | 10/1996 | Kameaki |
| 5,601,716 A | 2/1997 | Heinrich et al. |
| 5,637,850 A | 6/1997 | Honda |
| 5,656,311 A | 8/1997 | Fond |
| 5,677,522 A | 10/1997 | Rice et al. |
| 5,725,261 A | 3/1998 | Rahn |
| 5,742,979 A | 4/1998 | García-Hernando |
| 5,840,189 A | 11/1998 | Sylvan et al. |
| 5,888,549 A | 3/1999 | Buchholz et al. |
| 5,895,672 A | 4/1999 | Cooper |
| 5,917,165 A | 6/1999 | Platt et al. |
| 5,941,055 A | 8/1999 | Coates |
| 5,948,455 A | 9/1999 | Schaeffer et al. |
| 5,980,743 A | 11/1999 | Bairischer |
| 6,082,499 A | 7/2000 | O'Donnell |
| 6,153,026 A | 11/2000 | Michotte |
| 6,199,780 B1 | 3/2001 | Görlitz |
| 6,250,016 B1 | 6/2001 | Gravel |
| 6,289,643 B1 | 9/2001 | Bonar |
| 6,299,926 B1 | 10/2001 | Balakrishnan et al. |
| 6,440,256 B1 | 8/2002 | Gordon et al. |
| 6,451,332 B1 | 9/2002 | Tanaka et al. |
| 6,589,577 B2 | 7/2003 | Lazaris et al. |
| 6,598,800 B1 | 7/2003 | Schmit et al. |
| 6,607,762 B2 | 8/2003 | Lazaris et al. |
| 6,627,244 B2 | 9/2003 | Omura |
| 6,645,537 B2 | 11/2003 | Sweeney et al. |
| 6,655,260 B2 | 12/2003 | Keurig |
| 6,861,086 B2 | 3/2005 | Buckingham et al. |
| 6,871,448 B1 | 3/2005 | Kline |
| 6,948,420 B2 | 9/2005 | Kirschner et al. |
| 6,994,879 B2 | 2/2006 | Cirigliano et al. |
| 7,444,925 B2 | 11/2008 | Mahlich |
| 7,543,527 B2 | 6/2009 | Schmed |
| 7,552,672 B2 | 6/2009 | Schmed |
| 7,595,870 B2 | 9/2009 | Ringlien |
| 7,673,558 B2 | 3/2010 | Panesar et al. |
| 7,685,930 B2 | 3/2010 | Mandralis et al. |
| 7,712,258 B2 | 5/2010 | Ewing et al. |
| 7,743,557 B2 | 6/2010 | Liao |
| 7,779,578 B2 | 8/2010 | Gray |
| 7,815,953 B2 | 10/2010 | Mastropasqua et al. |
| 7,935,646 B2 | 5/2011 | Viazmensky et al. |
| 7,946,217 B2 | 5/2011 | Favre et al. |
| 7,981,451 B2 | 7/2011 | Ozanne |
| 8,039,029 B2 | 10/2011 | Ozanne |
| 8,039,034 B2 | 10/2011 | Ozanne |
| 8,088,423 B2 | 1/2012 | Ohresser et al. |
| 8,109,200 B2 | 2/2012 | Hansen |
| 8,114,461 B2 | 2/2012 | Perlman et al. |
| 8,163,318 B2 | 4/2012 | Ozanne et al. |
| 8,168,908 B2 | 5/2012 | Heimann |
| 8,257,766 B2 | 9/2012 | Yoakim et al. |
| 8,276,639 B2 | 10/2012 | Binacchi |
| 8,361,527 B2 | 1/2013 | Winkler et al. |
| 8,443,549 B2 | 5/2013 | Salvietti et al. |
| 8,474,368 B2 | 7/2013 | Kilber et al. |
| 8,491,948 B2 | 7/2013 | Ozanne et al. |
| 8,491,976 B2 | 7/2013 | Sato et al. |
| 8,505,440 B2 | 8/2013 | Kirschner et al. |
| 8,512,886 B2 | 8/2013 | Ozanne |
| 8,579,006 B2 | 11/2013 | Levin |
| 8,734,881 B2 | 5/2014 | Yoakim et al. |
| 8,794,125 B1 | 8/2014 | Rivera |
| 8,906,436 B2 | 12/2014 | Nowak |
| 8,916,220 B2 | 12/2014 | Mahlich et al. |
| 8,956,672 B2 | 2/2015 | Yoakim et al. |
| 9,072,402 B2 | 7/2015 | Ryser |
| 9,079,705 B2 | 7/2015 | Digiuni |
| 9,145,730 B1 | 9/2015 | Santamaria |
| 9,150,347 B2 | 10/2015 | Scheiber |
| 9,204,751 B2 | 12/2015 | Peterson |
| 9,216,854 B2 | 12/2015 | Schreiber |
| 9,271,602 B2 | 3/2016 | Beaulieu et al. |
| 9,290,317 B2 | 3/2016 | Quinn et al. |
| 9,295,278 B2 | 3/2016 | Nowak |
| 9,357,791 B2 | 6/2016 | Fountain et al. |
| 9,359,126 B2 | 6/2016 | Wong et al. |
| 9,359,128 B2 | 6/2016 | Mahlich |
| 9,392,902 B2 | 7/2016 | Parentes et al. |
| 9,394,101 B2 | 7/2016 | Empl |
| 9,409,703 B2 | 8/2016 | Krüger et al. |
| 9,409,704 B2 | 8/2016 | Digiuni et al. |
| 9,415,931 B2 | 8/2016 | Gerbaulet et al. |
| 9,428,328 B2 | 8/2016 | Trombetta et al. |
| 9,428,329 B2 | 8/2016 | Trombetta et al. |
| 9,434,525 B2 | 9/2016 | Fabozzi et al. |
| 9,486,108 B1 | 11/2016 | Douglas et al. |
| 9,808,112 B2 | 11/2017 | Favero et al. |
| 2001/0038204 A1 | 11/2001 | Nojima et al. |
| 2001/0047724 A1 | 12/2001 | Lazaris |
| 2002/0020659 A1 | 2/2002 | Sweeney |
| 2002/0048621 A1 | 4/2002 | Boyd et al. |
| 2002/0088807 A1 | 7/2002 | Perkovic et al. |

(56) References Cited

U.S. PATENT DOCUMENTS

| | | |
|---|---|---|
| 2002/0104373 A1 | 8/2002 | Ishihara et al. |
| 2002/0110626 A1 | 8/2002 | Buckingham et al. |
| 2003/0005826 A1 | 1/2003 | Sargent et al. |
| 2003/0039731 A1 | 2/2003 | Dalton et al. |
| 2003/0172813 A1 | 9/2003 | Schifferle |
| 2003/0222089 A1 | 12/2003 | Hale |
| 2004/0045443 A1 | 3/2004 | Lazaris et al. |
| 2004/0089158 A1 | 5/2004 | Mahlich |
| 2004/0089602 A1 | 5/2004 | Heinrich et al. |
| 2004/0115310 A1 | 6/2004 | Yoakim et al. |
| 2004/0182250 A1 | 9/2004 | Halliday et al. |
| 2005/0000164 A1 | 1/2005 | Jacobs |
| 2005/0016383 A1 | 1/2005 | Kirschner et al. |
| 2005/0045566 A1 | 3/2005 | Larkin et al. |
| 2005/0051478 A1 | 3/2005 | Karanikos et al. |
| 2005/0160919 A1 | 7/2005 | Balkau |
| 2005/0183581 A1 | 8/2005 | Kirschner et al. |
| 2005/0235571 A1 | 10/2005 | Ewing et al. |
| 2005/0266122 A1 | 12/2005 | Franceschi |
| 2006/0084344 A1 | 4/2006 | Bonneh |
| 2006/0107841 A1 | 5/2006 | Schifferle |
| 2006/0194004 A1 | 8/2006 | Niemoller et al. |
| 2006/0228447 A1 | 10/2006 | Ganesan et al. |
| 2006/0236871 A1 | 10/2006 | Ternite et al. |
| 2007/0148290 A1 | 6/2007 | Ternite et al. |
| 2007/0157821 A1 | 7/2007 | Panesar et al. |
| 2007/0181005 A1 | 8/2007 | Kirschner et al. |
| 2007/0181412 A1 | 8/2007 | Raunig |
| 2007/0203587 A1 | 8/2007 | Erlandsson et al. |
| 2007/0257118 A1 | 11/2007 | Riley et al. |
| 2007/0283640 A1 | 12/2007 | Shivak et al. |
| 2008/0024536 A1 | 1/2008 | Hirano et al. |
| 2008/0028946 A1 | 2/2008 | Kirschner et al. |
| 2008/0038441 A1 | 2/2008 | Kirschner |
| 2008/0085356 A1 | 4/2008 | Colliver et al. |
| 2008/0148948 A1 | 6/2008 | Evers et al. |
| 2008/0187638 A1 | 8/2008 | Hansen |
| 2008/0245236 A1 | 10/2008 | Ternite et al. |
| 2008/0299262 A1 | 12/2008 | Reati |
| 2008/0302251 A1 | 12/2008 | Rijskamp et al. |
| 2009/0004343 A1 | 1/2009 | Xiong et al. |
| 2009/0007793 A1 | 1/2009 | Glucksman et al. |
| 2009/0007796 A1 | 1/2009 | Ricotti |
| 2009/0126577 A1 | 5/2009 | Ternite |
| 2009/0136626 A1 | 5/2009 | Mueller |
| 2009/0211458 A1 | 8/2009 | Denisart et al. |
| 2009/0211713 A1 | 8/2009 | Binacchi |
| 2009/0289121 A1 | 11/2009 | Maeda et al. |
| 2009/0291379 A1 | 11/2009 | Oota et al. |
| 2009/0324788 A1 | 12/2009 | Roy et al. |
| 2009/0324791 A1 | 12/2009 | Ohresser et al. |
| 2010/0000667 A1 | 1/2010 | Funnell |
| 2010/0028495 A1 | 2/2010 | Novak et al. |
| 2010/0050880 A1 | 3/2010 | Suter et al. |
| 2010/0054532 A1 | 3/2010 | Mitte et al. |
| 2010/0078480 A1 | 4/2010 | Aker |
| 2010/0108541 A1 | 5/2010 | Roberto |
| 2010/0132564 A1 | 6/2010 | Ozanne et al. |
| 2010/0196545 A1 | 8/2010 | Buffet et al. |
| 2010/0239717 A1 | 9/2010 | Yoakim et al. |
| 2010/0239733 A1 | 9/2010 | Yoakim et al. |
| 2010/0239734 A1 | 9/2010 | Yoakim et al. |
| 2010/0260915 A1 | 10/2010 | Young |
| 2010/0263329 A1 | 10/2010 | Nash |
| 2010/0288131 A1 | 11/2010 | Kilber et al. |
| 2010/0288133 A1 | 11/2010 | Litzka et al. |
| 2010/0303964 A1* | 12/2010 | Beaulieu ............ B65D 85/8043 426/77 |
| 2011/0005399 A1 | 1/2011 | Epars et al. |
| 2011/0020500 A1 | 1/2011 | Eichler et al. |
| 2011/0033580 A1 | 2/2011 | Biesheuvel et al. |
| 2011/0041702 A1 | 2/2011 | Yoakim et al. |
| 2011/0064852 A1* | 3/2011 | Mann ................ B65D 85/8043 426/78 |
| 2011/0076361 A1 | 3/2011 | Peterson et al. |
| 2011/0097450 A1 | 4/2011 | Kruger |
| 2011/0142996 A1 | 6/2011 | Krüger |
| 2011/0189350 A1 | 8/2011 | Van Belleghem et al. |
| 2011/0212225 A1 | 9/2011 | Mariller |
| 2011/0250333 A1 | 10/2011 | Ozanne |
| 2011/0250812 A1 | 10/2011 | Pourdeyhimi et al. |
| 2011/0303095 A1 | 12/2011 | Fu et al. |
| 2012/0006685 A1 | 1/2012 | Van Engelen |
| 2012/0058226 A1 | 3/2012 | Winkler et al. |
| 2012/0060697 A1 | 3/2012 | Ozanne |
| 2012/0070542 A1 | 3/2012 | Camera et al. |
| 2012/0070543 A1* | 3/2012 | Mahlich ............ B65D 85/8043 426/77 |
| 2012/0070551 A1 | 3/2012 | Mahlich |
| 2012/0097041 A1 | 4/2012 | Bucher et al. |
| 2012/0097602 A1 | 4/2012 | Tedford |
| 2012/0121765 A1 | 5/2012 | Kamerbeek et al. |
| 2012/0123106 A1 | 5/2012 | Joos |
| 2012/0126834 A1 | 5/2012 | Kleinhans |
| 2012/0183657 A1 | 7/2012 | Marina et al. |
| 2012/0195155 A1 | 8/2012 | Gennai et al. |
| 2012/0201933 A1 | 8/2012 | Dran et al. |
| 2012/0207893 A1 | 8/2012 | Kruger |
| 2012/0251668 A1 | 10/2012 | Wong et al. |
| 2012/0251672 A1 | 10/2012 | Kamerbeek et al. |
| 2012/0258210 A1 | 10/2012 | Wong et al. |
| 2012/0295234 A1 | 11/2012 | Rognon et al. |
| 2012/0308688 A1 | 12/2012 | Peterson et al. |
| 2013/0055903 A1 | 3/2013 | Deuber |
| 2013/0059039 A1 | 3/2013 | Trombetta et al. |
| 2013/0064929 A1 | 3/2013 | Jarisch et al. |
| 2013/0064937 A1 | 3/2013 | Jarisch et al. |
| 2013/0084363 A1 | 4/2013 | Krueger et al. |
| 2013/0084376 A1 | 4/2013 | Fischer et al. |
| 2013/0101716 A1 | 4/2013 | Beaulieu et al. |
| 2013/0122153 A1 | 5/2013 | Ferrier et al. |
| 2013/0125762 A1 | 5/2013 | Dogan et al. |
| 2013/0129872 A1 | 5/2013 | Krueger et al. |
| 2013/0136828 A1 | 5/2013 | Anghileri |
| 2013/0149424 A1 | 6/2013 | Fischer |
| 2013/0156897 A1 | 6/2013 | Goldstein |
| 2013/0206011 A1 | 8/2013 | Ozanne et al. |
| 2013/0209618 A1 | 8/2013 | Trombetta et al. |
| 2013/0209619 A1 | 8/2013 | Mahlich |
| 2013/0209620 A1 | 8/2013 | Ozanne et al. |
| 2013/0209622 A1 | 8/2013 | Fountain et al. |
| 2013/0216663 A1 | 8/2013 | Dogan et al. |
| 2013/0243910 A1 | 9/2013 | Krueger et al. |
| 2013/0312619 A1 | 11/2013 | Spiegel et al. |
| 2014/0001563 A1 | 1/2014 | Krueger et al. |
| 2014/0004231 A1 | 1/2014 | Norton et al. |
| 2014/0017359 A1 | 1/2014 | Krueger et al. |
| 2014/0127364 A1 | 5/2014 | Fu et al. |
| 2014/0141128 A1 | 5/2014 | Trombetta et al. |
| 2014/0141129 A1 | 5/2014 | Greene |
| 2014/0161936 A1 | 6/2014 | Trombetta et al. |
| 2014/0178538 A1 | 6/2014 | Husband et al. |
| 2014/0196608 A1 | 7/2014 | Amrein et al. |
| 2014/0220191 A1 | 8/2014 | Kelly et al. |
| 2014/0224130 A1 | 8/2014 | Castellani et al. |
| 2014/0230370 A1 | 8/2014 | Bianchi |
| 2014/0263033 A1 | 9/2014 | Fu et al. |
| 2014/0287104 A1 | 9/2014 | Austin et al. |
| 2014/0287105 A1 | 9/2014 | Husband et al. |
| 2014/0346022 A1 | 11/2014 | Keller et al. |
| 2014/0348984 A1 | 11/2014 | Zeller et al. |
| 2014/0370181 A1 | 12/2014 | Young et al. |
| 2015/0010680 A9 | 1/2015 | Mahlich |
| 2015/0020481 A1 | 1/2015 | Hodler |
| 2015/0029702 A1 | 1/2015 | Foley |
| 2015/0056331 A1 | 2/2015 | Rivera |
| 2015/0056340 A1 | 2/2015 | Trombetta et al. |
| 2015/0056351 A1 | 2/2015 | Deuber |
| 2015/0079241 A1 | 3/2015 | Mahlich |
| 2015/0119220 A1 | 4/2015 | Rea et al. |
| 2015/0128525 A1 | 5/2015 | Bartoli et al. |
| 2015/0157164 A1 | 6/2015 | Digiuni |
| 2015/0158665 A1 | 6/2015 | Krueger et al. |
| 2015/0158666 A1 | 6/2015 | Krüger et al. |

(56) References Cited

U.S. PATENT DOCUMENTS

| | | |
|---|---|---|
| 2015/0166204 A1 | 6/2015 | Rea et al. |
| 2015/0173558 A1 | 6/2015 | Cross et al. |
| 2015/0175347 A1 | 6/2015 | Empl |
| 2015/0201790 A1 | 7/2015 | Smith et al. |
| 2015/0239652 A1 | 8/2015 | Trombetta et al. |
| 2015/0246741 A1 | 9/2015 | Hansen et al. |
| 2015/0274411 A1 | 10/2015 | Krueger |
| 2015/0297021 A1 | 10/2015 | Bugnano et al. |
| 2015/0297023 A1 | 10/2015 | Hansen et al. |
| 2015/0314954 A1 | 11/2015 | Empl |
| 2015/0329282 A1 | 11/2015 | Bartoli et al. |
| 2015/0353275 A1 | 12/2015 | Accursi |
| 2015/0375926 A1 | 12/2015 | Fischer |
| 2016/0001968 A1 | 1/2016 | Krüger et al. |
| 2016/0037961 A1 | 2/2016 | Digiuni |
| 2016/0045060 A1 | 2/2016 | Flick |
| 2016/0058234 A1 | 3/2016 | Eppler et al. |
| 2016/0066591 A1 | 3/2016 | Halliday et al. |
| 2016/0075506 A1 | 3/2016 | Chapman et al. |
| 2016/0194146 A1 | 7/2016 | Schelch et al. |
| 2016/0207696 A9 | 7/2016 | Trombetta et al. |
| 2016/0242594 A1 | 8/2016 | Empl et al. |
| 2016/0251150 A1 | 9/2016 | Macchi et al. |
| 2016/0325921 A1 | 11/2016 | Empl |
| 2016/0332759 A1 | 11/2016 | Trombetta et al. |
| 2016/0340110 A1 | 11/2016 | Trombetta et al. |
| 2017/0020329 A1 | 1/2017 | Douglas et al. |
| 2017/0027374 A1 | 2/2017 | Smith et al. |

FOREIGN PATENT DOCUMENTS

| | | |
|---|---|---|
| CA | 2400033 C | 2/2005 |
| CA | 2399290 C | 1/2006 |
| CA | 2399283 C | 5/2007 |
| CA | 2661921 A1 | 3/2008 |
| CA | 2763746 A1 | 3/2010 |
| CA | 2784752 C | 6/2011 |
| CA | 2662071 C | 7/2011 |
| CA | 2538256 C | 8/2011 |
| CA | 2810237 A1 | 3/2012 |
| CA | 2531544 C | 5/2012 |
| CA | 2839293 A1 | 12/2012 |
| CA | 2662069 C | 1/2013 |
| CA | 2785843 A1 | 2/2013 |
| CA | 2788283 A1 | 3/2013 |
| CA | 2850010 A1 | 5/2013 |
| CA | 2810236 C | 7/2013 |
| CA | 2866119 A1 | 9/2013 |
| CA | 2872667 A1 | 11/2013 |
| CA | 2874025 A1 | 12/2013 |
| CA | 2874070 A1 | 12/2013 |
| CA | 2877027 A1 | 12/2013 |
| CA | 2877090 A1 | 1/2014 |
| CA | 2886299 A1 | 4/2014 |
| CA | 2888129 A1 | 4/2014 |
| CA | 2888658 C | 6/2014 |
| CA | 2898173 A1 | 8/2014 |
| CA | 2902231 A1 | 8/2014 |
| CA | 2905188 A1 | 9/2014 |
| CA | 2901582 A1 | 11/2014 |
| CA | 2901664 A1 | 11/2014 |
| CA | 2922822 A1 | 2/2015 |
| CA | 2922824 A1 | 2/2015 |
| CA | 2832794 C | 3/2016 |
| CA | 2833096 C | 5/2016 |
| CN | 101014513 A | 8/2007 |
| CN | 101090657 A | 12/2007 |
| CN | 101646613 A | 2/2010 |
| CN | 102791595 A | 11/2012 |
| CN | 102958816 A | 3/2013 |
| CN | 103501624 A | 1/2014 |
| DE | 1207866 B | 12/1965 |
| DE | 1221960 B | 7/1966 |
| DE | 69615001 T2 | 3/2002 |
| DE | 102004056224 A1 | 5/2006 |
| DE | 202006003115 U1 | 5/2006 |
| DE | 102006004329 A1 | 8/2007 |
| DE | 202009014945 U1 | 9/2010 |
| DE | 202010007919 U1 | 11/2010 |
| DE | 102010027485 A1 | 1/2012 |
| DE | 102010034206 A1 | 2/2012 |
| DE | 102011012881 A1 | 3/2012 |
| DE | 102011010534 A1 | 8/2012 |
| DE | 102011115833 A1 | 4/2013 |
| DE | 102012105282 A1 | 12/2013 |
| DE | 102012110446 A1 | 1/2014 |
| DE | 102012109186 A1 | 3/2014 |
| DE | 102612109186 A1 | 3/2014 |
| DE | 102014018470 A1 | 6/2016 |
| EP | 0224297 A1 | 6/1987 |
| EP | 0244339 A1 | 11/1987 |
| EP | 0468078 A1 | 1/1992 |
| EP | 0468079 A1 | 1/1992 |
| EP | 0656224 A1 | 6/1995 |
| EP | 0859467 A1 | 8/1998 |
| EP | 0923865 A2 | 6/1999 |
| EP | 1129623 A1 | 9/2001 |
| EP | 1221418 A1 | 7/2002 |
| EP | 1263661 A1 | 12/2002 |
| EP | 1344722 A1 | 9/2003 |
| EP | 1344724 A1 | 9/2003 |
| EP | 1363501 A2 | 11/2003 |
| EP | 1471012 A2 | 10/2004 |
| EP | 1500358 A1 | 1/2005 |
| EP | 1555219 A1 | 7/2005 |
| EP | 1559351 A2 | 8/2005 |
| EP | 1586534 A1 | 10/2005 |
| EP | 1710173 A1 | 10/2006 |
| EP | 1774878 A1 | 4/2007 |
| EP | 1792850 A1 | 6/2007 |
| EP | 1796516 A2 | 6/2007 |
| EP | 1849718 A1 | 10/2007 |
| EP | 1882432 B1 | 1/2008 |
| EP | 1892199 A1 | 2/2008 |
| EP | 1974638 A1 | 10/2008 |
| EP | 2158829 A1 | 3/2010 |
| EP | 1882431 B1 | 4/2010 |
| EP | 2218653 A1 | 8/2010 |
| EP | 2230195 A1 | 9/2010 |
| EP | 2239211 A1 | 10/2010 |
| EP | 2284102 A1 | 2/2011 |
| EP | 2287090 A1 | 2/2011 |
| EP | 2345352 A1 | 7/2011 |
| EP | 2364930 A2 | 9/2011 |
| EP | 2384133 B1 | 11/2011 |
| EP | 2384996 A1 | 11/2011 |
| EP | 2412645 A1 | 2/2012 |
| EP | 2412646 A1 | 2/2012 |
| EP | 2444339 A1 | 4/2012 |
| EP | 2476633 A1 | 7/2012 |
| EP | 2484505 A2 | 8/2012 |
| EP | 2510805 A2 | 10/2012 |
| EP | 2537778 A1 | 12/2012 |
| EP | 2559636 A1 | 2/2013 |
| EP | 2647317 A1 | 10/2013 |
| EP | 2720961 A1 | 4/2014 |
| EP | 2750876 A1 | 7/2014 |
| EP | 2752372 A1 | 7/2014 |
| EP | 2809006 A1 | 12/2014 |
| EP | 2909088 A1 | 8/2015 |
| EP | 2971319 A1 | 1/2016 |
| EP | 2996522 A1 | 3/2016 |
| FR | 2556323 A1 | 6/1985 |
| FR | 2912124 A1 | 8/2008 |
| FR | 2963332 A1 | 2/2012 |
| GB | 1402799 A | 8/1975 |
| GB | 2482032 A | 1/2012 |
| GB | 2489409 A | 10/2012 |
| JP | S62-130649 A | 6/1987 |
| JP | S62-168512 A | 7/1987 |
| JP | 02289207 A | 11/1990 |
| JP | H0394377 A | 4/1991 |
| JP | H04176311 A | 6/1992 |
| JP | 2001-017094 A | 1/2001 |

(56) References Cited

FOREIGN PATENT DOCUMENTS

| | | |
|---|---|---|
| JP | 2001-082699 A | 3/2001 |
| JP | 2003-265320 A | 9/2003 |
| JP | 2004-097015 A | 4/2004 |
| JP | 2004-533305 A | 11/2004 |
| JP | 2007-522856 A | 8/2007 |
| JP | 2009-511143 A | 3/2009 |
| JP | 2010-500199 A | 1/2010 |
| JP | 2010-516364 A | 5/2010 |
| JP | 2011-530321 A | 12/2011 |
| KR | 1020050107747 A | 11/2005 |
| NZ | 596919 A | 11/2013 |
| WO | 98/51396 A1 | 11/1998 |
| WO | 99/58035 A1 | 11/1999 |
| WO | 2001/60712 A1 | 8/2001 |
| WO | 02/078498 A1 | 10/2002 |
| WO | 2004/082390 A1 | 9/2004 |
| WO | 2005/044067 A1 | 5/2005 |
| WO | 2005/079638 A1 | 9/2005 |
| WO | 2006/014936 A2 | 2/2006 |
| WO | 2006/021405 A2 | 3/2006 |
| WO | 2006/053635 A1 | 5/2006 |
| WO | 2006/121520 A2 | 11/2006 |
| WO | 2007/042414 A1 | 4/2007 |
| WO | 2007/042486 A2 | 4/2007 |
| WO | 2008011913 A1 | 1/2008 |
| WO | 2008/090122 A2 | 7/2008 |
| WO | 2008/107645 A2 | 9/2008 |
| WO | 2008/121489 A1 | 10/2008 |
| WO | 2008126045 A1 | 10/2008 |
| WO | 2008/0132571 A1 | 11/2008 |
| WO | 2009/084061 A1 | 7/2009 |
| WO | 2009/114119 A1 | 9/2009 |
| WO | 2009/115475 A1 | 9/2009 |
| WO | 2009/130311 A1 | 10/2009 |
| WO | 2009/153161 A1 | 12/2009 |
| WO | 2010/007633 A1 | 1/2010 |
| WO | 2010138563 A1 | 2/2010 |
| WO | 2010/013146 A3 | 4/2010 |
| WO | 2010/041179 A2 | 4/2010 |
| WO | 2010/085824 A1 | 8/2010 |
| WO | 2010/118545 A2 | 10/2010 |
| WO | 2010/137952 A1 | 12/2010 |
| WO | 2010/137960 A1 | 12/2010 |
| WO | 2011/012501 A1 | 2/2011 |
| WO | 2011/089049 A1 | 7/2011 |
| WO | 2011/137550 A1 | 11/2011 |
| WO | 2011/147491 A1 | 12/2011 |
| WO | 2011/147553 A1 | 12/2011 |
| WO | 2011/147591 A1 | 12/2011 |
| WO | 2012/007257 A1 | 1/2012 |
| WO | 2012/009668 A1 | 1/2012 |
| WO | 2012/010317 A1 | 1/2012 |
| WO | 2012/019902 A1 | 2/2012 |
| WO | 2012/038063 A1 | 3/2012 |
| WO | 2012/080501 A1 | 6/2012 |
| WO | 2012/080928 A1 | 6/2012 |
| WO | 2012/100977 A1 | 8/2012 |
| WO | 2012/104760 A1 | 8/2012 |
| WO | 2012/127233 A2 | 9/2012 |
| WO | 2012123106 A1 | 9/2012 |
| WO | 2012/135204 A1 | 10/2012 |
| WO | 2012/174331 A1 | 12/2012 |
| WO | 2012/175985 A1 | 12/2012 |
| WO | 2013/008012 A2 | 1/2013 |
| WO | 2013/029184 A1 | 3/2013 |
| WO | 2013/032330 A1 | 3/2013 |
| WO | 2013/043048 A1 | 3/2013 |
| WO | 2013/053757 A1 | 4/2013 |
| WO | 2013/064988 A1 | 5/2013 |
| WO | 2013/136209 A1 | 9/2013 |
| WO | 2013/149354 A2 | 10/2013 |
| WO | 2013/171663 A1 | 11/2013 |
| WO | 2013/189555 A1 | 12/2013 |
| WO | 2013/189923 A1 | 12/2013 |
| WO | 2014/001563 A1 | 1/2014 |
| WO | 2014/001564 A1 | 1/2014 |
| WO | 2014/006048 A2 | 1/2014 |
| WO | 2014/049143 A2 | 4/2014 |
| WO | 2014090567 A1 | 6/2014 |
| WO | 2014/102702 A1 | 7/2014 |
| WO | 2014/127863 A1 | 8/2014 |
| WO | 2014/128205 A1 | 8/2014 |
| WO | 2014/131779 A1 | 9/2014 |
| WO | 2012/000878 A2 | 1/2015 |
| WO | 2015/028425 A2 | 3/2015 |
| WO | 2015/062703 A1 | 5/2015 |
| WO | 2015/075584 A1 | 5/2015 |
| WO | 2015/107484 A1 | 7/2015 |
| WO | 2016/077916 A1 | 5/2016 |

OTHER PUBLICATIONS

Rawle, Alan, "Particle Sizing—An Introduction" 2012; Silver Colloids, Edition or volume on Colloidal Silver.

* cited by examiner

PORTION CAPSULE AND METHOD FOR PRODUCING A BEVERAGE BY MEANS OF A PORTION CAPSULE

The present invention relates to a portion capsule for producing a beverage, having a capsule body with a capsule base and a filling side, with a cavity for accommodating a pulverulent or liquid beverage base being formed between the capsule base and the filling side, and with a filter element being arranged between the beverage base and the capsule base.

Portion capsules of this kind are generally known from the prior art. By way of example, documents EP 1792850 B1, EP 1344722 A1 and US 2003/0172813 A1 disclose portion capsules of this generic type for preparing coffee and espresso.

Portion capsules of this kind for producing a beverage are preferably in the form of a truncated cone or cylinder and are produced, for example, from a thermoformed plastic film or using a plastic injection-molding process. Said portion capsules usually have an open filling side with a collar edge onto which a cover film or foil is sealed or adhesively bonded, and a closed capsule base, with a filter element which is supported, for example, against the capsule base being arranged between the beverage base and the capsule base. These filter elements are either injection-molded from a thermoplastic or are thermoformed or stamped from a plastic film.

For the purpose of preparing a coffee beverage, the portion capsule is inserted into a brewing chamber of a preparation appliance. After or during the closing process of the brewing chamber, the capsule is preferably opened on its closed base side by means of an outflow element and/or an opening means, for example a tapping mandrel which is arranged in the brewing chamber, or the outflow element and/or opening means penetrate/penetrates an opening which is already present in the capsule base. After the brewing chamber is sealed off, the filling side of the portion capsule, which filling side is closed by a closure film or foil, is tapped by means of at least one puncturing means. Preparation liquid, preferably hot water, is then delivered into the portion capsule under pressure. The preparation liquid flows through the beverage base and extracts and/or dissolves the substances, which are required for producing the beverage, from the beverage base. For the purpose of preparing an espresso, for example a brewing water pressure of up to 20 bar acts on the coffee powder for the purpose of extracting the essential oils. Furthermore, this pressure also acts on the filter element which is situated between the coffee powder and the capsule base and in front of the punctured capsule outlet. The ready beverage preferably flows along the outflow element and/or the opening means, out of the brewing chamber, and into a collection element, for example a cup or a mug.

The object of the present invention was therefore to provide a portion capsule having a filter arrangement, which portion capsule is simpler to manufacture in comparison to the prior art.

This object is achieved by a portion capsule for producing a beverage, having a capsule body with a capsule base and a filling side, with a cavity for accommodating a pulverulent or liquid beverage base being formed between the capsule base and the filling side, and with a filter element being arranged between the beverage base and the capsule base, and an outflow element and/or an opening means projecting through the capsule base into the cavity when the beverage is being produced, with the filter element being rigid at least in sections and being provided on or in the region of the capsule base such that the outflow element and/or the opening means tap/taps the filter element, pierce/pierces the filter element and/or move/moves the filter element relative to the capsule body.

In comparison to the prior art, the portion capsule according to the invention has the advantage that no distance or no large distance has to be provided between the filter element and the capsule base. As a result, the portion capsule can be smaller given the same quantity of beverage base and/or the quantity of beverage base can be increased. The filter element itself can have a simpler geometry. It was very surprising and unexpected that the filter element can be tapped, pierced or moved relative to the capsule body, in particular relative to the capsule base, without the quality of beverage being adversely affected. The beverage production apparatus can be produced with greater tolerances. For example, the opening mandrel can be designed to be longer, as a result of which it is ensured that the capsule is fully opened before the hot water enters the portion capsule.

The present invention relates to a portion capsule. Portion capsules of this kind for producing a beverage are preferably in the form of a truncated cone or cylinder and are produced, for example, from a thermoformed plastic film or using a plastic injection-molding process. Said portion capsules usually have an open filling side with a collar edge onto which a cover film or foil is sealed or adhesively bonded, a side wall region which is generally provided in the form of a cylinder or truncated cone, and a capsule base, with a filter element which is preferably supported against the capsule base being arranged between the beverage base and the capsule base.

These filter elements are stiff, that is to say either injection-molded from a thermoplastic or thermoformed or stamped from a plastic film, for example, at least in sections. However, the filter element can also be produced from any other desired material which is familiar to a person skilled in the art. Examples include a paper or paper-like material or a natural material. The filter element 7 can have, in particular in its central region 7", a recess 20 into which the outflow element and/or the opening means are/is inserted before making contact with the filter element 7 and, in the process, tapping said filter element 2, piercing said filter element 7 and/or moving said filter element 7 relative to the capsule body 2. The filter element has at least one region in which the beverage base is retained but through which extraction liquid can flow. An example of this is a region which has a large number of holes of which the cross section is selected such that the particles of beverage base are not allowed to pass through or not allowed to pass through to a significant extent but through which the extraction medium, for example the hot water, flows. The filter element can have a region through which the extraction medium does not flow. This region may be located, for example, above the region into which the outflow element or the opening means enters. This region can also be produced from a different material to the rest of the filter element and/or have a different material thickness. This region can have, for example, a greater degree of elasticity than the rest of the filter element. This region is at least temporarily plastically or elastically deformed, in particular when it is tapped or pierced. The filter element can be flat.

A cavity can be provided between the filter element and the capsule base, that is to say the filter element can be arranged at a certain distance from the capsule base at least in sections. For example, the filter element can rest on the capsule base only in its edge region and/or be connected to the side wall of the portion capsule only in the edge region.

According to the invention however, the filter element is provided in the portion capsule such that the outflow element and/or an opening means of the preparation appliance make/makes contact with the filter element at least temporarily before or during production of the beverage and, in the process, tap/taps said filter element, pierce/pierces said filter element and/or move/moves said filter element relative to the capsule body.

In order to prepare a coffee beverage, the portion capsule is inserted into a brewing chamber of a preparation appliance. After or during the closing process of the brewing chamber, the capsule is preferably opened on its closed base side by means of an outflow element which is arranged in the brewing chamber and/or by means of an opening means, or the outflow element and/or opening means pass through an opening which is already present in the capsule base. In the process, the outflow element and/or an opening means make/makes contact with the filter element and tap/taps said filter element, pierce/pierces said filter element and/or move/moves said filter element relative to the portion capsule. After the brewing chamber is sealed off, the filling side of the portion capsule, which filling side is closed by a closure film or foil, is tapped by means of at least one puncturing means. Preparation liquid, preferably hot water, is then delivered into the portion capsule under pressure. The preparation liquid flows through the beverage base and extracts and/or dissolves the substances, which are required for producing the beverage, from the beverage base. For the purpose of preparing an espresso, for example a brewing water pressure of up to 20 bar acts on the coffee powder for the purpose of extracting the essential oils. Furthermore, this pressure also acts on the filter element which is situated between the coffee powder and the capsule base and in front of the punctured capsule outlet. The ready beverage preferably flows along the outflow element and/or the opening means, out of the brewing chamber, and into a collection element, for example a cup or a mug.

The portion capsule is preferably hermetically sealed. This means that the beverage or food product powder, for example coffee powder, soup powder or tea, contained in the portion capsule is sealed off from the environment in a substantially aroma-tight manner before the extraction process. However, the portion capsule does not have to be hermetically sealed, but rather can also be provided in a hermetically sealed package before use, this hermetically sealed package then being manually opened for example.

The filter element is preferably simply inserted into the capsule body and then rests either loosely on the capsule base or is connected to said capsule base and/or to the side wall of the capsule, in particular before the capsule body is filled with the beverage base.

The capsule body is preferably in the form of a truncated cone or cylinder and is, for example, produced from plastic, a natural material and/or a biologically degradable material comprising a thermoformed plastic film or using a plastic injection-molding process. The capsule body preferably has, on the filling side, a collar edge onto which a cover film or foil is sealed or adhesively bonded. As an alternative, it is feasible for the capsule body and a capsule cover to be connected to one another by means of a mechanical method. The base of the portion capsule is preferably closed and is preferably first perforated in the brewing chamber by means of an outflow element and/or an opening means for producing an outlet opening, said outflow element and/or opening means acting on the portion capsule base from the outside.

However, another feasible alternative would be for the base of the portion capsule to already be provided with an outlet opening at the factory, said outlet opening preferably being sealed off by means of a sealing film or foil. The sealing film or foil can then be perforated, for example, by means of the perforation means or can be pulled off from the capsule base by hand. The sealing film or foil is preferably a plastic film which has at least one barrier layer, for example a metal layer, in particular an aluminum layer. The plastic film preferably has a "peel-off layer" on its side facing the capsule in order to be able to remove the plastic film from the capsule base comparatively easily.

The outlet opening is preferably so large that it can receive an outflow element, which may be present, and/or an opening means without contact. The outlet opening is particularly preferably so large that it exhibits no appreciable pressure loss when the ready beverage flows out, in particular that there is no appreciable eddying of the ready beverage which could lead to air being introduced into the beverage and therefore to the formation of foam.

According to a further subject matter or a further embodiment of the present invention, provision is made for the filter element to be arranged in the cavity in the portion capsule and to rest on a side of the capsule base which faces the filling side. The production costs for the portion capsule are advantageously considerably reduced since the filter element is simply inserted only loosely into the portion capsule. The filter element is preferably fixed by the beverage substance which, when the portion capsule is filled, is arranged on the filter element and therefore firmly holds the filter element.

According to a further preferred embodiment of the present invention, provision is made for the edge region to extend at least partially along a side wall region of the capsule body, with the side wall region extending between the filling side and the capsule base.

According to a further preferred embodiment of the present invention, provision is made for the filter element to completely or only partially cover the capsule base. In particular, it is sufficient for the filter element to be arranged solely in the region of the perforation or in the region of an outlet opening in the capsule base.

According to a further preferred embodiment of the present invention, provision is made for the filter element to be attached to the capsule base, with the filter element preferably being attached to the capsule base in a cohesive manner, in particular by sealing. This advantageously prevents the filter element from slipping. This attachment is preferably carried out by means of ultrasonic welding.

According to a further preferred embodiment of the present invention, provision is made for the filter element to be attached to the capsule base in an edge region of the capsule base, and/or for the filter element to be attached to the side wall region in an edge region of the filter element. This advantageously prevents the filter element from slipping and increases the sealing effect between the capsule body and the filter element, but with it further being made possible to lift off the filter element at the same time.

According to a further preferred embodiment of the present invention, provision is made for the capsule base to have a protrusion in a direction opposing the filling side. The protrusion advantageously serves to accommodate the perforation means.

According to a further preferred embodiment of the present invention, provision is made for the capsule base to have a predetermined breaking point which is intended to tear open as a result of mechanical contact with an external perforation means, with the predetermined breaking point preferably having a plurality of lines of weakness which are arranged in a star shape around a central point of the capsule base. The capsule base preferably has a reduced material thickness along the lines of weakness and/or is perforated along the lines of weakness. Perforation of the capsule base is advantageously assisted by implementing the predetermined breaking point. This also has the advantage that a less sharp perforation spike for perforating the capsule base can be used, and therefore the risk of damage to the filter element when the filter element is lifted off by the perforation spike is reduced. In particular, a blunt perforation means is now sufficient for perforating the capsule base.

According to a further preferred embodiment, the capsule base permanently has an output opening which is preferably sealed off by a film or foil, with the film or foil particularly preferably having a pull-off tab for pulling off the film or foil by hand. Perforation of the capsule base by means of an external perforation means is advantageously unnecessary in this case. Before the portion capsule is inserted into the brewing chamber, the film or foil is simply pulled off the capsule base by means of the pull-off tab and the brewing process can be started. This embodiment has the advantage that the beverage liquid does not flow out of the output opening under high pressure and therefore the formation of foam ("crema"), in particular when producing an americano or tea, is prevented.

A further preferred subject matter of the present invention is a method for producing a beverage using a portion capsule, with the portion capsule being provided with a rigid filter element in a first method step, with an outflow element and/or an opening means penetrating the capsule base in a second method step, and the outflow element and/or the opening means the filter element tapping the filter element, piercing the filter element and/or moving the filter element relative to the capsule body in a third method step.

These processes of tapping said filter element, piercing said filter element and/or moving said filter element relative to the capsule body preferably take place when the portion capsule is inserted into the brewing chamber and/or when the brewing chamber is closed.

The statements made in relation to one subject matter of the present invention apply to the other subjects in equal measure, and vice versa.

A further subject matter of the present invention is the use of a portion capsule for producing a beverage, preferably for producing a coffee, cocoa, tea and/or milk beverage.

The statements made in relation to one subject matter of the present invention apply to the other subjects in equal measure, and vice versa.

Exemplary embodiments of the invention are illustrated in the figures and explained in greater detail in the following description. The figures are described merely by way of example and do not restrict the general concept of the invention. The description applies to all subjects of the present invention in equal measure.

In the various figures, identical parts are always provided with the same reference symbols and therefore also will be generally cited or mentioned only once in each case.

Figure 1:
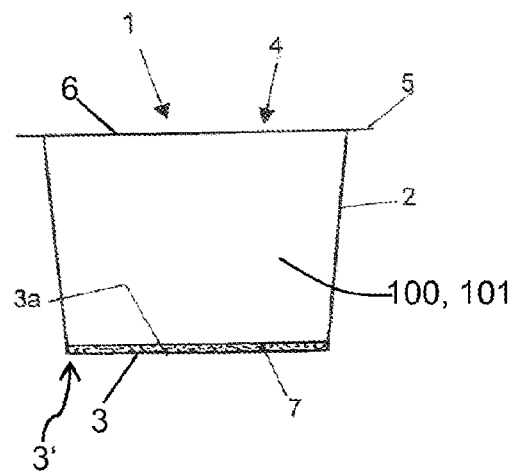
FIG. 1 shows a longitudinal section through a portion capsule according to a first embodiment of the present invention, which portion capsule is designed for the purpose of preparing an espresso.

FIG. 1 illustrates a first embodiment of the portion capsule 1 according to the invention. The portion capsule 1 comprises a capsule body 2 in the form of a truncated cone, having a closed capsule base 3 and having a collar edge 5 which is arranged on the filling side 4 of said capsule body and to which a cover film or foil 6 is welded or adhesively bonded. Therefore, a cavity 100, which is preferably sealed off in an air- and aroma-tight manner, is formed between the capsule base 3 and the cover film or foil 6, said cavity being filled with a pulverulent or granular beverage substance 101. In this case, the beverage substance 101 comprises, for example, a coffee, cocoa, tea and/or milk powder (or granules). A rigid filter element 7 comprising a plastic material is arranged on the inner side 3a of the closed capsule body base 3, that is to say within the cavity 100. The filter element 7 is situated either loosely on the inner side 3a of the capsule base 3 or is firmly, that is to say preferably cohesively, connected to the inner side 3a of the capsule body base 3. In the second variant, the filter element 7 is attached in a cohesive manner to the capsule base 3, in particular only in an edge region 3' of the capsule base 3. In the present case, the filter element is of at least partially rigid design. The filter element is, for example, a molded, injection-molded, thermoformed and/or stamped part.

Figure 2:
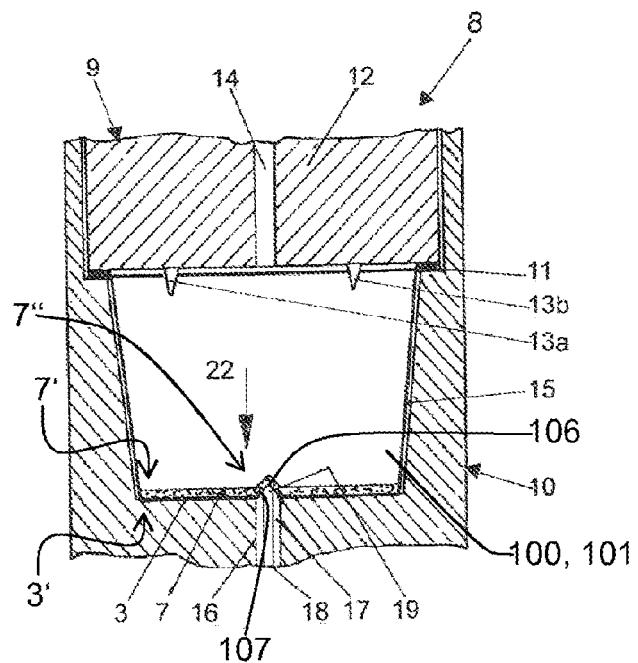
FIG. 2 shows a longitudinal section through a portion capsule, which is situated in a closed brewing chamber, according to the first embodiment of the present invention.

FIG. 2 illustrates a portion capsule 1 according to the first embodiment, which is illustrated in FIG. 1, of the present invention, with the portion capsule 1 in FIG. 2 being arranged in a closed brewing chamber 8. The brewing chamber 8 consists of a first brewing chamber element 9 and a second brewing chamber element 10, with the first brewing chamber element 9 being provided for the purpose of inserting the portion capsule 1 such that it can move in relation to the second brewing chamber element 10, or vice versa. A seal 11 is arranged between the two brewing chamber elements 9, 10. The first brewing chamber element 9 substantially consists of a closing piston 12 with puncturing elements 13a, 13b for opening the cover film or foil 6 of the portion capsule 1, a preparation liquid supply means 14 and the seal 11. The second brewing chamber element 10 substantially consists of a brewing chamber bell 15 which partially surrounds the portion capsule 1 and has an opening mandrel 16 which is arranged on the base of the brewing chamber bell 15 and is provided with discharge grooves 17, and a beverage discharge means 18. For the purpose of accommodating the portion capsule 1, the brewing chamber 8 is in an open state, not illustrated, in which the first and the second brewing chamber element 9, 10 are spaced apart from one another in order to ensure supply of the portion capsule 1, and in the illustrated closed state, in which a preparation process for producing a beverage using the portion capsule 1 can be carried out. In the closed state, the brewing chamber 8 is sealed off in a pressure-tight manner. When the brewing chamber 8 is moved from the open state to the depicted closed state, the puncturing elements 13a, 13b pierce the cover film or foil 6, so that preparation liquid, in particular hot brewing water, passes through the preparation liquid supply means 14 under pressure into the cavity 100 in the portion capsule 1. Furthermore, when the brewing chamber 8 is closed, the capsule base 3 is perforated by the outflow element, which is in the form of an opening mandrel 16, and/or an opening means, and therefore an output opening 107 is produced in the portion capsule 1, it being possible for the produced beverage liquid to leave the portion capsule 1 in the direction of the beverage discharge means 18 through said output opening. In order to assist delivery of the beverage liquid, the opening mandrel 16 is provided with the discharge grooves 17 on its casing surface. In the illustration, the opening mandrel 16 of the second brewing chamber element pierces the base 3 of the portion capsule 1, which is contained in the brewing chamber 9, 10, and the filter element 7, which is situated above the puncturing point, is slightly raised by the puncturing spike 19 of the opening mandrel 16 and said puncturing spike taps said filter element but said perforation means does not pierce said filter element. The capsule base 3 optionally has, at its central point 106 in which the capsule base 3 is perforated by the opening mandrel 16, a predetermined breaking point 104, and therefore a comparatively blunt opening mandrel 16 is sufficient for perforating the capsule base 3.

Once the outflow element and/or an opening means penetrate/penetrates the portion capsule, the liquid, for example hot water when coffee is being produced, flows into the capsule 1. In the capsule, this liquid flows through the beverage base 101 and extracts and/or dissolves the substances, which are required to produce the beverage, from the beverage base 101. The flow of the liquid in the beverage base 101 is illustrated by reference symbol 22. The resulting beverage then flows through the filter element 7 which is arranged between the beverage base 101 and the on the capsule base 3, this preventing constituents of the beverage base 101 entering the resulting beverage in particulate form and further entering a collection vessel, for example a cup or pot, via the opening made in the capsule base 3 by the opening mandrel 16 and via the discharge grooves 17 in the opening mandrel 16.

Figure 3A:
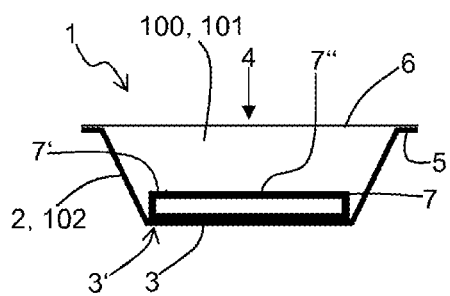
FIGS. 3a, 3b show schematic sectional views through a portion capsule according to a second embodiment of the present invention.
Figure 3B:
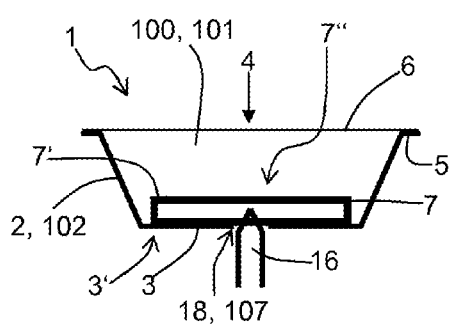

FIGS. 3a and 3b illustrate schematic sectional views through a portion capsule 1 according to a second embodiment of the present invention, the second embodiment substantially resembling the first embodiment, which is illustrated in FIGS. 1 and 2, with the filter element 7 once again being of rigid design. FIG. 3a illustrates the portion capsule 1 in its starting position, while FIG. 3b illustrates said portion capsule in a state in which it is perforated by the perforation means 16 (the portion capsule 1 is located in a brewing chamber 8, not illustrated further, in FIG. 3b). When the perforation means 16 penetrates the portion capsule, the filter element 7 is tapped, in its central region 7" in this case, but said perforation means does not pierce said filter element. At the same time, the filter element can be moved relative to the capsule body 2 to a certain extent.

Figure 4A:
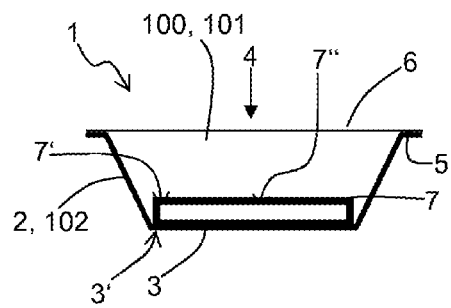
FIGS. 4a, 4b show schematic sectional views through a portion capsule according to a third embodiment of the present invention.
Figure 4B:
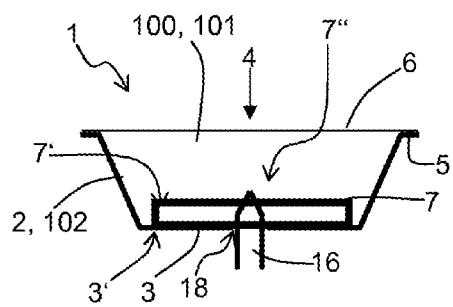

FIGS. 4a and 4b show schematic sectional views through a portion capsule 1 according to a third embodiment of the present invention, with the third embodiment being substantially identical to the second embodiment which is illustrated in FIGS. 3a and 3b. In this case, the filter element 7 is once again of rigid design and is not only tapped by the perforation means 16, but said perforation means pierces said filter element.

Figure 5A:
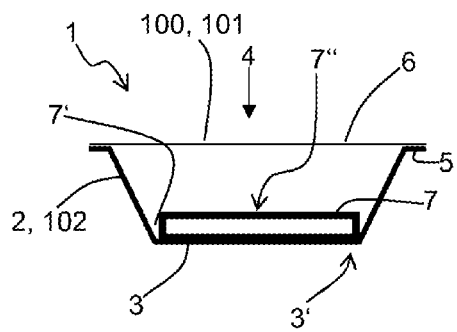
FIGS. 5a, 5b show schematic sectional views through a portion capsule according to a fourth embodiment of the present invention.
Figure 5B:
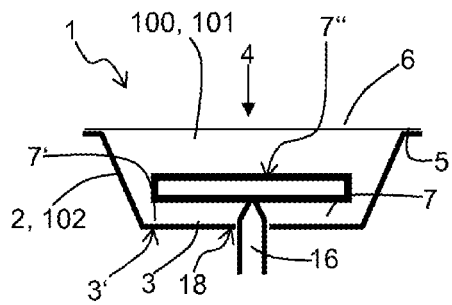

FIGS. 5a and 5b illustrate schematic sectional views through a portion capsule 1 according to a fourth embodiment of the present invention, with the fourth embodiment being substantially identical to the third embodiment, which is illustrated in FIGS. 4a and 4b. If the capsule base 3 is perforated by the perforation means 16 or the perforation means passes through an opening which is already present in the capsule base, the filter element 7 is lifted away from the capsule base 3 by the perforation means 16. The filter element is tapped but preferably not pierced in the process.

Figure 6A:
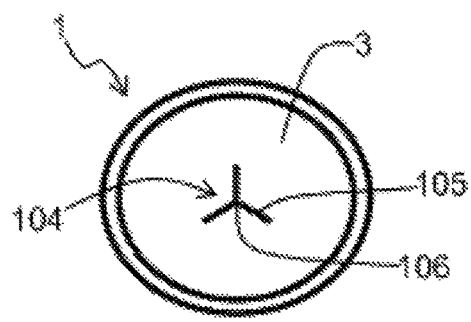
FIGS. 6a, 6b show schematic sectional views through a portion capsule according to a fifth embodiment of the present invention.
Figure 6B:
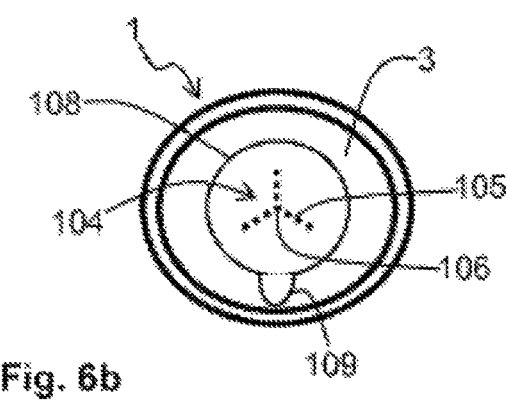
Figure 8:
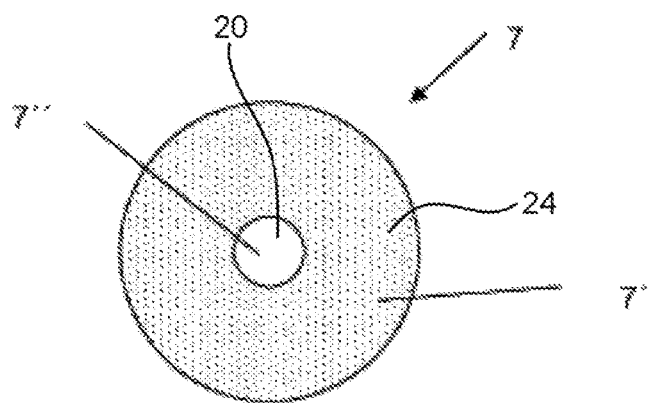
FIG. 8 shows a plan view of a filter element.

FIGS. 6a and 6b illustrate a view of a capsule base 3 of a portion capsule 1 according to a fifth embodiment of the present invention, said fifth embodiment substantially resembling the first embodiment, which is illustrated in FIGS. 1 and 2, with the portion capsule 1 being illustrated from "the bottom" in FIG. 8. This view shows the optional predetermined breaking point 104 which comprises three lines 105 of weakness which are arranged in the form of a star and in the radial direction around the central point 106 on the capsule base 3. The capsule base 3 has a reduced material thickness and/or the capsule base 3 is pre-perforated along the lines 105 of weakness in order to assist perforation in the brewing chamber 8. In order to retain the aroma of the beverage substance 101 for relatively long periods of time even in the case of a pre-perforated capsule base 3, the capsule base 3 is preferably sealed with a film or foil 108, which can be perforated or pulled off by hand, at least in the region of the predetermined breaking point 104. For this purpose, the film or foil 108 sticks, for example, to the outer side of the capsule base 3 and is provided with a pull-off tab 109 which does not stick to the capsule base 3 and at which the film or foil 108 can be pulled off by hand. An exemplary embodiment with lines 105 of weakness in the form of perforations in the capsule base 3 and also with a film or foil 108 is illustrated in FIG. 8b.

Figure 7:
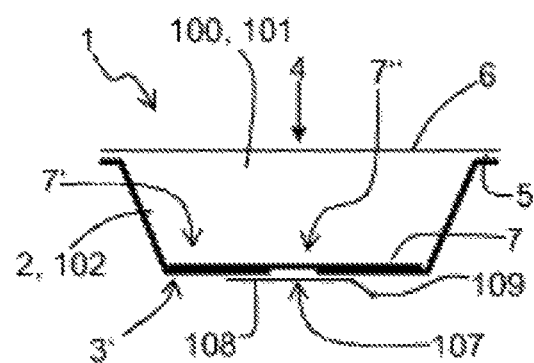
FIG. 7 shows a schematic view of a capsule base of a portion capsule according to a sixth embodiment of the present invention.

FIG. 7 illustrates a sectional view of a portion capsule 1 according to a sixth embodiment of the present invention. The sixth embodiment substantially resembles the first embodiment, which is illustrated in FIG. 1, with the portion capsules 1 of the sixth embodiment being equipped with a permanent output opening 107 in the capsule base 3, said output opening being sealed by the film or foil 108 in the starting position. Therefore, the portion capsule 1 does not have predetermined breaking points. In this case, the film or foil 108 likewise has the pull-off tab 109 for pulling off the film or foil 108 by hand. The capsule base 3 is not perforated by means of an external perforation means 16. Instead, before the portion capsule 1 is inserted into the brewing chamber 8, the film or foil 108 is simply pulled off from the capsule base 3 by means of the pull-off tab 109 and the brewing process can then be started directly and without perforation of the capsule base 3.

FIG. 8 illustrates a filter element 7 which is substantially flat and substantially rigid, that is to say is molded and/or injection-molded from a plastic material or stamped or thermoformed/deep-drawn from a film or foil, for example. This filter element has a filter region 7' which, in the present case, has a large number of recesses 24 of which the cross section is selected such that said filter element 7 allows the extraction liquid to pass through but retains the substrate particles. In its central region 7", the filter element 7 has a region which does not have any recesses, that is to say through which the extraction liquid does not flow. This region can be produced from a different material, in particular a different plastic material, to the rest of the filter element. As an alternative or in addition, the region can have a different, in particular lower, material thickness than the rest of the filter element. In particular, the central region 7" has a greater degree of elasticity than the rest of the filter element.

LIST OF REFERENCE SYMBOLS

1 Portion capsule
2 Capsule body
3 Capsule base
3a Inner side of the capsule base
3' Edge region of the capsule base
4 Filling side
5 Collar edge
6 Cover film or foil
7 Filter element
7' Filter region of the filter element
7" Central region of the filter element
8 Brewing chamber
9 First brewing chamber element
10 Second brewing chamber element
11 Seal
12 Closing piston
13a Puncturing element
13b Puncturing element
14 Preparation liquid supply means
15 Brewing bell
16 Outflow element, opening mandrel, perforation means
17 Outlet grooves
18 Discharge means
19 Puncturing spike
20 Recess
21 Protrusion
22 Preparation liquid flow
23 Brewing bell base
24 recesses
100 Cavity
101 Beverage base
102 Side wall region
104 Predetermined breaking point
105 Lines of weakness
106 Central point
107 Output opening
108 Film or foil
109 Pull-off tab

The invention claimed is:

1. A portion capsule for producing a beverage comprising:
a capsule body with a capsule base and a filling side, the capsule base having an inside surface,
a cavity for accommodating a pulverulent or liquid base formed between the capsule base and the filling side, and
a filter element arranged in the cavity between the pulverulent or liquid base and the capsule base, the filter element is configured to separate extraction liquid from the pulverulent or liquid base,
wherein the filter element consists of a rigid injection molded element,
wherein the filter element is moveable from a first configuration to a second configuration,
wherein in the first configuration, an entirety of a lower surface of the filter element is in contact with the inside surface of the capsule base and an upper surface of the filter element directly contacts at least some of the pulverulent or liquid base, and
wherein in the second configuration, the entirety of the lower surface of the filter element is lifted away from the inside surface of the capsule base.

2. The portion capsule as claimed in claim 1, wherein the filter element is connected to the capsule base or to a side wall region of the capsule body.

3. The portion capsule as claimed in claim 1, wherein the filter element completely covers the capsule base.

4. The portion capsule as claimed in claim 1, wherein the capsule base has an output opening which is sealed off by a film or foil, the film or foil having a pull-off tab for pulling off the film or foil by hand.

5. The portion capsule as claimed in claim 1, wherein the filter element comprises a recess into which an outflow element and/or an opening means are/is inserted before making contact with the filter element.

6. The portion capsule as claimed in claim 1, wherein the filter element is arranged solely in a region of perforation of an outlet opening of the capsule body.

7. The portion capsule as claimed in claim 1, wherein the filter element comprises recesses for allowing the extraction liquid to pass though the filter element, and
wherein the filter element comprises a region that is free of any recesses so that the extraction liquid is prevented from flowing through the region of the filter element that is free of any recesses.

8. The portion capsule as claimed in claim 7, wherein the region that is free of any recesses is located in a center area of the filter element.

9. The portion capsule as claimed in claim 1, wherein a shape of the filter element is maintained when an outflow element moves the filter element relative to the capsule body.

10. The portion capsule as claimed in claim 1, wherein in the second configuration, the filter element is maintained generally parallel to the inside surface of the capsule base.

11. The portion capsule as claimed in claim 1, wherein to move the filter element from the first configuration to the second configuration, a perforation means is configured to pass through the capsule base and lift the filter element away from the inside surface of the capsule base.

12. The portion capsule as claimed in claim 11, wherein the filter element is not pierced by the perforation means.

13. A portion capsule for producing a beverage comprising:
a capsule body with a capsule base and a filling side,
a cavity for accommodating a pulverulent or liquid base formed between the capsule base and the filling side, and
a filter element arranged in the cavity between the pulverulent or liquid base and the capsule base, the filter element is configured to separate extraction liquid from the pulverulent or liquid base, the filter element consists of a rigid injection molded element,
wherein the filter element is moveable from a first configuration to a second configuration,
wherein in the first configuration, an entirety of a lower surface of the filter element is in contact with an inside surface of the capsule base and an upper surface of the filter element directly contacts at least some of the pulverulent or liquid base, and
wherein in the second configuration, the entirety of the lower surface of the filter element is lifted away from the inside surface of the capsule base.

14. The portion capsule as claimed in claim 13, wherein the filter element comprises a recess into which an outflow element and/or an opening means are/is inserted before making contact with the filter element.

15. The portion capsule as claimed in claim 13, wherein the filter element comprises recesses for allowing the extraction liquid to pass though the filter element, and
   wherein the filter element comprises a region that is free of any recesses so that the extraction liquid is prevented from flowing through the region that is free of any recesses.

16. A method for producing a beverage using the portion capsule as claimed in claim 1, wherein an outflow element and/or an opening means penetrate/penetrates the capsule base in a method step, and the outflow element and/or the opening means tap/taps the filter element, pierce/pierces the filter element and/or move/moves the filter element relative to the capsule body in another method step.

17. The method as claimed in claim 16, wherein the outflow element and/or the opening means make/makes contact with the filter element in a central region of the filter element.

\* \* \* \* \*